United States Patent [19]
Yamaura et al.

[11] Patent Number: 4,680,231
[45] Date of Patent: Jul. 14, 1987

[54] LOW-VELOCITY ELECTRON EXCITED PHOSPHOR

[75] Inventors: Tatsuo Yamaura; Hisamitsu Takahashi, both of Mobara, Japan

[73] Assignee: Futaba Denshi Kogyo Kabushiki Kaisha, Mobara, Japan

[21] Appl. No.: 800,034

[22] Filed: Nov. 20, 1985

[30] Foreign Application Priority Data

Nov. 28, 1984 [JP] Japan ................... 59-249707

[51] Int. Cl.$^4$ .............................................. C09K 11/50
[52] U.S. Cl. ................... 428/407; 252/301.36;
252/301.4 R; 252/301.4 F; 252/301.4 S;
252/301.4 P; 252/301.4 H; 252/301.5;
252/301.6 S; 252/301.6 R; 252/301.6 P;
252/301.6 F; 428/403; 428/522; 428/532;
428/690; 428/691
[58] Field of Search ............. 252/301.6 S, 301.36,
252/301.4 R, 301.4 F, 301.4 S, 301.4 P, 301.4
H, 301.5, 301.6 P, 301.6 R, 301.6 F; 428/403,
407, 522, 532, 690, 691

[56] References Cited

U.S. PATENT DOCUMENTS 3,700,479 10/1972 Arents .................. 252/301.36 X
4,275,333 6/1981 Kagami et al. ........... 252/301.6 S X
4,409,306 10/1983 Gerstle et al. ............. 252/301.36 X

FOREIGN PATENT DOCUMENTS 2647080 4/1978 Fed. Rep. of Germany ... 252/301.6 S

Primary Examiner—Jack Cooper
Attorney, Agent, or Firm—Oblon, Fisher, Spivak, McClelland & Maier

[57] ABSTRACT

Low-velocity electron excited phosphor of the mixture-type is disclosed which is capable of being used for the patterning of phosphor layers by photolithography. The phosphor comprises a phosphor material in the form of particles and a conductive material in the form of fine particles securely deposited thereon by means of an organic binder. Also, a process for preparing such phosphor is disclosed.

6 Claims, 7 Drawing Figures

LOW-VELOCITY ELECTRON EXCITED PHOSPHOR

BACKGROUND OF THE INVENTION

1. Field of the Invention

This invention relates to low-velocity electron excited phosphor for a fluorescent display device used as a display for a domestic electric appliance, an automobile, an electronic game machine, a terminal equipment of a computer or the like and a process for preparing the same, and more particularly to low-velocity electron excited phosphor comprising a mixture of phosphor having high resistance and a conductive material added thereto and a process for preparing the same.

2. Description of the Prior Art

In general, a fluorescent display device, as shown in FIG. 7, is generally constructed in a manner such that a flat box-type casing 20 of which a part is used as an anode substrate 14 is provided, and wiring conductors 15 and insulating layers 16 formed with through-holes 17a are laminated in turn on the anode substrate 14. On the insulating layers 16 are arranged anode conductors 17 in a pattern shape which are electrically connected to the wiring conductors 15 via the through-holes 17a. The anode conductors 17 each have a low-velocity electron excited phosphor layer (hereinafter referred to as "phosphor layer") 18 deposited thereon, resulting in each combination of the anode conductor 17 and phosphor layer 18 constituting each anode 19. Above the anodes 19 are stretchedly arranged control electrodes 11 and filamentary cathodes 12 in order so as to be opposite to the anodes. Thus, the conventional fluorescent display device constructed as described above causes each of the insulating layers 16 to be exposed at the portion thereof positioned at the periphery of the phosphor layer 18.

In the conventional fluorescent display device constructed as described above, electrons emitted from the filamentary cathodes 12 heated are selected by the control electrodes 11 and impinged on the phosphor layers 18 of the anodes 19 to which anode voltage is selectively applied to excite the phosphor layers so that the phosphor layers may emit light to carry out display of character, figure or the like.

Now, phosphor for forming the phosphor layer 18 deposited on the anode of the fluorescent display device will be described hereinafter.

Low-velocity electron excited phosphor to be used for a fluorescent display device is required to have the following characteristics:

A. It possesses suitable electric conductivity;
B. It is essentially low in luminous threshold;
C. It exhibits satisfied luminous efficiency under low-velocity electron excitation and does not cause the saturation of luminance;
D. It is stable against a heat treatment in the manufacturing process of a fluorescent display device and an environment in the process; and
E. It has a prolonged life under low-velocity electron excitation.

As is apparent from the above, important one of requirements for low-velocity electron excited phosphor is that it has suitable electric conductivity. In generrl, phosphor is divided into three types depending upon a way of providing it with electrical conductivity, as follows:

i. Low-resistance matrix-type phosphor

Phosphor of the first type uses a conductive material as its parent material, as in a ZnO:Zn or $SnO_2$:Eu phosphor.

ii. Mixture-type phosphor

Phosphor of the second type consists of a mixture of phosphor used for a cathode ray tube of a color television and the like, such as, for example;
$Y_2O_2S$:Eu; $Y_2O_3$:Eu; $YVO_4$:Eu; $(Zn_{1-x}Cd_x)S$:Ag $0.65 < x \leq 0.9$; $Zn_3(PO_4)_2$:Mn; $Cd_2B_2O_5$:Mn; $Zn(S_{1-x}Se_x)$:Cu $0.05 \leq x \leq 0.6$; $Zn(S_{1-x}Se_x)$:Cu,Al $0.05 \leq x < 0.6$; $(Zn_{1-x}Cd_x)S$:Ag,Al $0.5 < x \leq 0.7$; $(Zn_{1-x}Cd_x)S$:Au,Al $0 \leq x \leq 0.2$; $(Zn_{1-x}Cd_x)$:Cu $0.1 < x \leq 0.2$; $(Zn_{1-x}Cd_x)S$:Cu,Al $0.1 < x \leq 0.2$; $CaSiO_3$:Pb,Mn; $(Zn_{1-x}Cd_x)S$:Cu,Al $0 \leq x \leq 0.1$; $SrGa_2S_4$:Eu$^{2+}$; $Y_{3-}(Al_{1-x}Ga_x)_5O_{12}$:Ce $0 \leq x \leq 0.5$; $Zn_2SiO_4$:Mn; $Y_2O_2S$:Tb; $La_2O_2S$:Tb; $(Zn_{1-x},Cd_x)S$:Ag $0.3 \leq x \leq 0.5$; ZnS:Au,Al; ZnS:Cu,Al; ZnS:Cu,Au,Al; $Zn_2SiO_4$:Mn,As; $(Zn_{1-x},Cd_x)S$:Cu $0 \leq x \leq 0.1$; $(Zn_{1-x}Cd_x)S$:Ag,Al $0.3 \leq x \leq 0.5$; ZnS:Ag; ZnS:Ag,Al; Zn(S,Se):Ag; Zn(S,Se):Ag,Al; $Y_2SiO_5$:Ce; $SrGa_2S_4$:Ce; $Ca_2MgSiO_5$:Ce; $(Ca,Mg)_2SiO_4$:Ti; $(Ba,Mg)O_2.6Al_2O_3$:Eu$^{2+}$; $(Sr,Ba)_3(PO_4)_2$:Eu$^{2+}$; $Ca_2B_5O_9Cl$:Eu$^{2+}$ or the like and a conductive material, such as, for example $SnO_2$, $In_2O_3$, ZnO or the like to decrease its overall resistance.

iii. Doped-type phosphor

Phosphor of the third type generally consists of an electrical insulating phosphor material and an impurity doped in the phosphor material to provide it with conductivity and includes, for example, ZnS:Ag,Zn,Al phosphor and the like.

The present invention, as described above, is directed to mixture-type phosphor and more particularly, improved mixture-type phosphor containing a conductive material in the form of fine particles having a particle size of several microns or less and adapted to be used for the formation of pattern or patterning of phosphor layers according to photolithography using photosensitive resin.

In conventional mixture-type phosphor, as a conductive material is used at least one material which is selected from the group consisting of conductive metal oxides such as indium oxide ($In_2O_3$), zinc oxide (ZnO), tin oxide ($SnO_2$), titanium oxide ($TiO_2$), tungsten oxide ($WO_3$), niobium oxide ($Nb_2O_3$) and the like and conductive metal sulfides such as cadmium sulfide (CdS), copper sulfide ($Cu_2S$) and the like.

As known in the art, the division of a conductive material into fine particles permits the luminance of phosphor to be improved. For this purpose, it is advantageous to use a conductive material having a particle distribution of which median is $0.1-2.4\mu$ and standard deviation is $0.7\mu$ or less. The mixing ratio of the conductive material to a phosphor material in phosphor is of from 14:1 to 1:14 by weight, and the conductive material is mixed with the phosphor material while stirring by means of a mortar, ball mill or the like.

Accordingly, the conventional mixture-type phosphor is formed in such a manner as shown in FIG. 4. More particularly, a conductive material 1 is separated into two states, one being deposited on the surface of a phosphor material 2 due to physical force and the other being dispersed in a system in a manner separated from the phosphor material 2. Also, the conductive material 1 exists in the form of not only simple substances but aggregates.

The formation of pattern or patterning of phosphor layers using such conventional phosphor as described above may be carried out according to techniques widely known in the art such as printing, electro-deposition, precipitation or the like. However, such conventional techniques each have a disadvantage of failing in the fine patterning of phosphor layers with high precision. In the light of such a disadvantage, photolithography using a photosensitive resin material has been proposed and practiced for such fine patterning.

Nevertheless, the patterning of phosphor layers formed of the conventional mixture-type phosphor by photolithography often causes the conductive material to be separated from the phosphor material even when photosensitive phosphor paste is formed by mixing the phosphor material and liquid photosensitive resin together, because the conductive material exists in the states of being physically adhered to the phosphor material and separated therefrom as described above. More particularly, the patterning is carried out in such a manner as shown in FIG. 5. First, photosensitive phosphor paste 18 is applied onto the overall exposed surfaces of anode conductors 17 and insulating layers 16 arranged on an anode substrate 14 in order to form phosphor layers. Then, the phosphor layers applied are selectively exposed to ultraviolet rays so that only the phosphor layers for the pattern sections may be irradiated. Thereafter, a developer is put on the anode substrate to wash out the phosphor layers deposited on the insulating layers except the phosphor layers 18a for the pattern sections deposited on the anode conductors.

However, although such patterning permits the developer to wash out the phosphor material in the form of particles because the particles have a somewhat large size, it fails to remove the conductive material 1 by the developer since the material 1 is in the form of fine particles having a diameter of $0.1-2.4\mu$ which is small sufficiently to cause it to adhere onto the insulating layers 16 as shown in FIG. 6. Also, when the developing is highly carried out, the chipping or peeling of the phosphor layer 18a for the pattern section often occurs. This causes the surface of the insulating layer 16 to be rendered conductive, resulting in a failure in insulation.

SUMMARY OF THE INVENTION

The present invention has been made in view of the foregoing disadvantage of the prior art.

Accordingly, it is an object of the present invention to provide mixture-type phosphor which is capable of being used for the formation of pattern or patterning of phosphor layers as well and a process for preparing such mixture-type phosphor.

In accordance with one aspect of the present invention, there is provided low-velocity electron excited phosphor comprising a phosphor material in the form of particles having high resistance such as;
$Y_2O_2S:Eu$; $Y_2O_3:Eu$; $YVO_4:Eu$; $(Zn_{1-x}Cd_x)S:Ag$ $0.65 < x \leq 0.9$; $Zn_3(PO_4)_2:Mn$; $Cd_2B_2O_5:Mn$; $Zn(S_{1-x}Se_x):Cu$ $0.05 \leq x \leq 0.6$; $Zn(S_{1-x}Se_x):Cu,Al$ $0.05 \leq x < 0.6$; $(Zn_{1-x}Cd_x)S:Ag,Al$ $0.5 < x \leq 0.7$; $(Zn_{1-x}Cd_x)S:Au,Al$ $0 \leq x \leq 0.2$; $(Zn_{1-x}Cd_x):Cu$ $0.1 < x \leq 0.2$; $(Zn_{1-x}Cd_x)S:Cu,Al$ $0.1 < x \leq 0.2$; $CaSiO_3:Pb,Mn$; $(Zn_{1-x}Cd_x)S:Cu,Al$ $0 \leq x \leq 0.1$; $SrGa_2S_4:Eu^{2+}$; $Y_3(Al_{1-x}Ga_x)_5O_{12}:Ce$ $0 \leq x \leq 0.5$; $Zn_2SiO_4:Mn$; $Y_2O_2S:Tb$; $La_2O_2S:Tb$; $(Zn_{1-x}Cd_x)S:Ag$ $0.3 \leq x \leq 0.5$; $ZnS:Au,Al$; $ZnS:Cu,Al$; $ZnS:Cu,Au,Al$; $Zn_2SiO_4:Mn,As$; $(Zn_{1-x}Cd_x)S:Cu$ $0 \leq x \leq 0.1$; $(Zn_{1-x}Cd_x)S:Ag,Al$ $0.3 \leq x \leq 0.5$; $ZnS:Ag$; $ZnS:Ag,Al$; $Zn(S,Se):Ag$; $Zn(S,Se):Ag,Al$; $Y_2SiO_5:Ce$; $SrGa_2S_4:Ce$; $Ca_2MgSiO_5:Ce$; $(Ca,Mg)_2SiO_4:Ti$; $(Ba,Mg)O_2.6Al_2O_3:Eu^{2+}$; $(Sr,Ba)_3(PO_4)_2:Eu^{2+}$; $Ca_2B_5O_9Cl:Eu^{2+}$ or the like and a conductive material in the form of fine particles such as $In_2O_3$, $SnO_2$, $ZnO$, $TiO_2$, $WO_3$, $Nb_2O_3$, $CdS$, $Cu_2S$ or the like deposited on the surface of said particles of said phosphor material by means of an organic binder to decrease the resistance of the phosphor material.

Also, in accordance with another aspect of the present invention, there is provided a process for preparing low-velocity electron excited phosphor comprising the steps of dispersing a phosphor material in the form of particles having high resistance such as;
$Y_2O_2S:Eu$; $Y_2O_3:Eu$; $YVO_4:Eu$; $(Zn_{1-x}Cd_x)S:Ag$ $0.65 < x \leq 0.9$; $Zn_3(PO_4)_2:Mn$; $Cd_2B_2O_5:Mn$; $Zn(S_{1-x}Se_x):Cu$ $0.05 \leq x \leq 0.6$; $Zn(S_{1-x}Se_x):Cu,Al$ $0.5 \leq x < 0.6$; $(Zn_{1-x}Cd_x)S:Ag,Al$ $0.5 < x \leq 0.7$; $(Zn_{1-x}Cd_x)S:Au,Al$ $0 \leq x \leq 0.2$; $(Zn_{1-x}Cd_x):Cu$ $0.1 < x \leq 0.2$; $(Zn_{1-x}Cd_x)S:Cu,Al$ $0.1 < x \leq 0.2$; $CaSiO_3:Pb,Mn$; $(Zn_{1-x}Cd_x)S:Cu,Al$ $0 \leq x \leq 0.1$; $SrGa_2S_4:Eu^{2+}$; $Y_3(Al_{1-x}Ga_x)_5O_{12}:Ce$ $0 \leq x \leq 0.5$; $Zn_2SiO_4:Mn$; $Y_2O_2S:Tb$; $La_2O_2S:Tb$; $(Zn_{1-x}Cd_x)S:Ag$ $0.3 \leq x \leq 0.5$; $ZnS:Au,Al$; $ZnS:Cu,Al$; $ZnS:Cu,Au,Al$; $Zn_2SiO_4:Mn,As$; $(Zn_{1-x}Cd_x)S:Cu$ $0 \leq x \leq 0.1$; $(Zn_{1-x}Cd_x)S:Ag,Al$ $0.3 \leq x \leq 0.5$; $ZnS:Ag$; $ZnS:Ag,Al$; $Zn(S,Se):Ag$; $Zn(S,Se):Ag,Al$; $Y_2SiO_5:Ce$; $SrGa_2S_4:Ce$; $Ca_2MgSiO_5:Ce$; $(Ca,Mg)_2SiO_4:Ti$; $(Ba,Mg)O_2.6Al_2O_3:Eu^{2+}$; $(Sr,Ba)_3(PO_4)_2:Eu^{2+}$; $Ca_2B_5O_9Cl:Eu^{2+}$ or the like and a conductive material in the form of fine particles such as $In_2O_3$, $SnO_2$, $ZnO$, $TiO_2$, $WO_3$, $Nb_2O_3$, $CdS$, $Cu_2S$ or the like in an organic binder solution while mixing to form a phosphor slurry, mixing the phosphor slurry with a solution which is non-solvent of the organic binder solution while stirring to precipitate the phosphor material having the conductive material deposited thereon, and recovering and drying the precipitated phosphor having the conductive material deposited thereon.

The mixture-type phosphor according to the present invention constructed in such a manner as described above is free of any conductive material separated from the phosphor material, because the conductive material in the form of fine particles is securely deposited on the surface of the phosphor material so that the conductive material may be removed together with the phosphor material except that for pattern sections during the removal of the phosphor material at the developing stage by photolithography.

BRIEF DESCRIPTION OF THE DRAWINGS

These and other objects and many of the attendant advantages of the present invention will be readily appreciated as the same becomes better understood by reference to the following description when considered in connection with the accompanying drawings, wherein.

DETAILED DESCRIPTION OF THE PREFERRED EMBODIMENTS

Figure 1:
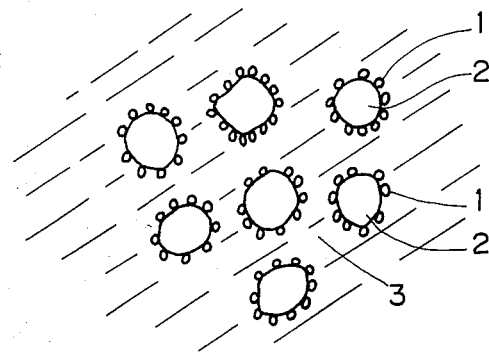
FIG. 1 is a schematic view showing photosensitive phosphor paste using phosphor according to the present invention.

First, the preparation of phosphor according to the present invention will be described with reference to the following examples; however, these examples are intended to illustrate the invention and are not to be construed to limit the scope of the invention.

EXAMPLE 1

20 g of a powdery $In_2O_3$ conductive material was mixed with 80 g of 1.25% polyvinyl alcohol aqueous solution which is water-soluble polymer acting as an organic binder to prepare a mixture, and the mixture was then water-ground in a ball mill to form dispersion in which fine particles of $In_2O_3$ having an average particle size of 0.3 $\mu$m were dispersed. 15 g of the dispersion thus formed was added to 27 g of a powdery ZnS:Cu,Al phosphor material to form a mixture, which was uniformly blended to form a slurry. Subsequently, the slurry was added to a mixed solvent of 120 ml of butyl acetate and 180 ml of acetone which are non-solvents of the polyvinyl alcohol aqueous solution for a period of 10–20 seconds while stirring. This resulted in water which is a solvent component of the polyvinyl alcohol being dissolved into butyl acetate and acetone to cause the polyvinyl alcohol to fall into a dehydrated state. The fine $In_2O_3$ particles dispersed in the polyvinyl alcohol aqueous solution was deposited on the surface of the phosphor material in the form of particles using the polyvinyl alcohol as a binder and then precipitated. The phosphor material thus formed having the conductive material deposited thereon was subjected to filtration under reduced pressure and recovered.

The recovered phosphor material having the conductive material deposited thereon was dried at about 80° C. for 30 minutes, and phosphor ZnS:Cu,Al+$In_2O_3$ was obtained in which $In_2O_3$ was adhered in an amount of 10% to the phosphor material.

In the example, polyvinyl alcohol was used as the organic binder. However, methyl cellulose may be used therefor. A material to be used for the organic binder is required to be organic solvent-insoluble and water-soluble polymer. Any polymer which meets such requirements may be used for the organic binder.

The phosphor thus prepared comprising the phosphor material and the conductive material deposited thereon effectively prevents the separation of the conductive material from the phosphor material in an organic solvent. Accordingly, it is conveniently used for the patterning of phosphor layers by photolithography using an organic solvent as a developer.

EXAMPLE 2

20 g of a powdery $In_2O_3$ conductive material was mixed with 80 g of 1.25% solution of ethyl cellulose, which is solvent-soluble polymer and acts as an organic binder, in a solution of carbitol and ethanol mixed in a ratio of 1:2 to form a mixture, which was then water-ground in a ball mill to form dispersion in which $In_2O_3$ in the form of fine particles having an average diameter of 0.5$\mu$ was uniformly distributed.

15 g of the dispersion thus formed was added to 27 g of a powdery $V_2O_2S$:Eu phosphor material and uniformly mixed therewith to form a slurry. The slurry was then added to 300 ml of water while stirring to cause carbitol and ethanol which are a mixed solvent for the ethyl cellulose to be dissolved in water because of its water-solubility, resulting in the ethyl cellulose being deposited on the surface of the phosphor material because of its water-insolubility. Concurrently, $In_2O_3$ dispersed in ethyl cellulose was deposited on the surface of the phosphor material together with the cellulose and then the phosphor material was precipitated. The precipitated phosphor material having the conductive material deposited thereon was subjected to filtration under reduced pressure and recovered. The phosphor material recovered was then dried. In this manner, phosphor of the present invention which comprises $V_2O_2S$:Eu and $In_2O_3$ deposited on the phosphor material in an amount of 10% was obtained.

In the example, ethyl cellulose was used as the organic binder. However, any other polymers may be used as the organic binder so long as they are water-insoluble and solvent-soluble as in nitrocellulose.

The phosphor of the present invention prepared as described above is substantially free of the dissolving of the binder in an aqueous solution to prevent the conductive material from being separated from the phosphor material. Thus, it allows water and an aqueous solution to be used as a developer for the patterning of phosphor layers by photolithography.

The formation of pattern or patterning of phosphor layers will be described hereinafter which is carried out by photolithography using phosphor of the present invention obtained in such a manner as described above.

Figure 2:
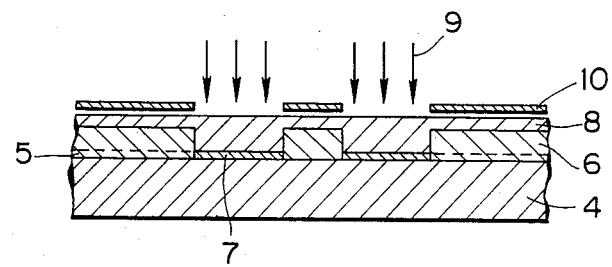
FIGS. 2 and 3 each are a fragmentary sectional view showing procedures of photolithography using phosphor according to the present invention.
Figure 3:
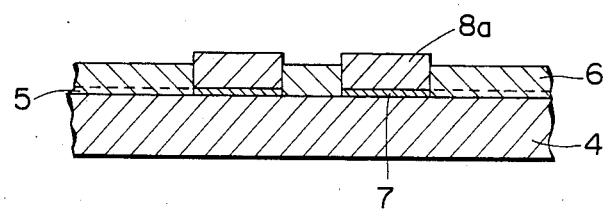
Figure 4:
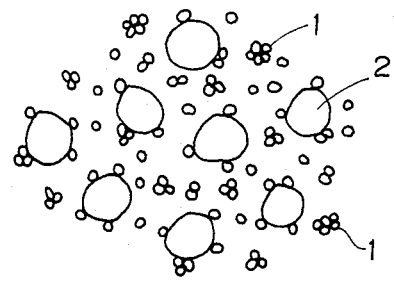
FIG. 4 is an enlarged view showing conventional mixture-type phosphor.
Figure 5:
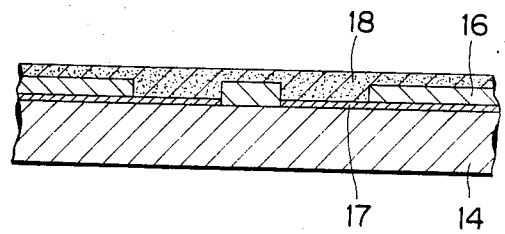
FIGS. 5 and 6 each are a fragmentary sectional view showing procedures of photolithography using conventional mixture-type phosphor.
Figure 6:
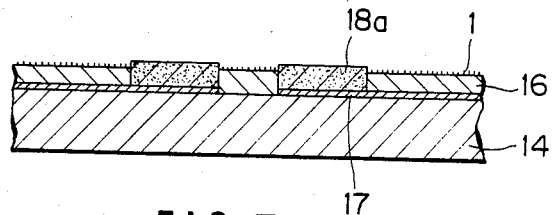
Figure 7:
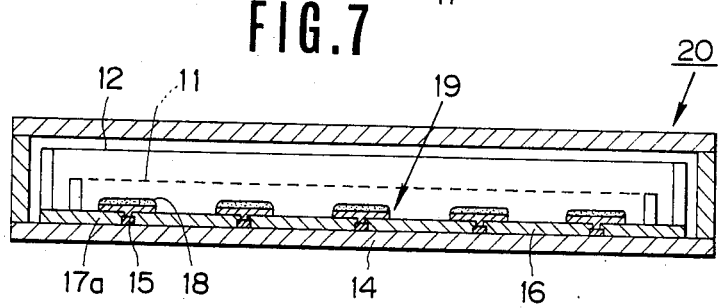
FIG. 7 is a schematic sectional view illustrating the structure of a fluorescent display device.

Phosphor comprising a phosphor material in the form of particles and a conductive material in the form of fine particles deposited thereon by means of a binder formed of solvent-insoluble and water-soluble polymer as obtained in Example 1 described above may be used for the patterning of phosphor layers according to the following procedures:

First, photosensitive phosphor paste is prepared by mixing the phosphor and liquid photosensitive resin of the nega-type together. In the photosensitive paste thus formed, as shown in FIG. 1, a phosphor material 2 having a conductive material 1 deposited thereon is dispersed in liquid photosensitive resin 3. The photosensitive paste is then applied to the overall exposed surface of each of wiring conductors 5, insulating layers 6 and anode conductors 7 laminatedly arranged on an anode substrate 4 in turn in a similar manner to the conventional phosphor as shown in FIG. 2, and then only the photosensitive paste for pattern sections 8a (FIG. 3) is subjected to ultraviolet irradiation through a mask 10. Such irradiation causes the pattern sections 8a to be cured and the photosensitive paste other than that for the pattern sections to be remain uncured. This allows the uncured photosensitive paste to be washed out by an organic solvent developer at a subsequent developing stage. At this time, the conductive material in the form of fine particles is kept at a state of being fixedly adhered to the phosphor material by means of the binder because the binder is not dissolved in the developer. Thus, the conductive material is coalesced with the phosphor material, and the portion of the conductive material and phosphor material at which the binder is not cured is removed together at the developing stage. This results in the phosphor layers in which the conductive material does not remain on the insulating layers after the development as shown in FIG. 3 constituting the pattern sections 8a.

Next, the patterning of phosphor layers using phosphor comprising a phosphor material in the form of particles and a conductive material in the form of fine particles deposited thereon by means of a binder of water-insoluble and solvent-soluble polymer as obtained in Example 2 described above may be carried out according to the following procedures.

First, the phosphor is mixed with a PVA aqueous solution and dichromate to form photosensitive phosphor paste.

The application of the photosensitive phosphor paste onto an anode substrate and the exposure of the phosphor paste to ultraviolet rays may be carried out in substantially the same manner as described above.

The development may be carried out using water as a developer, and this results in the formation of a satisfied pattern of phosphor layers wherein the conductive material in the form of fine particles does not remain on the insulating layers.

As can be seen from the foregoing, the phosphor of the present invention comprises of the particulate phosphor material which is adapted to emit light due to the impingement of low-velocity electrons thereon and the conductive material in the form of fine particles deposited on the surface of the phosphor material by means of the organic binder, and the process according to the present invention is to provide such phosphor by dispersing the phosphor material and conductive material in the organic binder solution to form the phosphor slurry and mixing the phosphor slurry with a sulution containing a non-solvent of the organic binder solution while stirring to deposit the fine particles of the conductive material on the surface of the phosphor material.

Accordingly, the phosphor of the present invention is substantially free of any conductive material in the form of fine particles separated from the phosphor material, because it is securely adhered to the particles of the phosphor material having high resistance. This allows the development to be readily accomplished in the patterning of phosphor layers by photolithography and eliminates a failure in insulation due to the adhesion of the conductive material onto the insulating layers.

Also, the present invention permits all the conductive material in the form of fine particles to be deposited on the phosphor material, resulting in the conductive material being uniformly distributed on the surface of the phosphor material to ensure uniform emission without irregular luminance.

Further, when the phosphor of the present invention is used for phosphor layers of a fluorescent display device, it carries out the emission with good efficiency and improves the luminance under low voltage conditions because the conductive material in the form of fine particles exists in only a state of being uniformly deposited on the surface of the phosphor material.

Furthermore, the phosphor of the present invention is substantially free of any free conductive material which does not contribute to the provision of phosphor having low resistance, to thereby render the content of the conductive material in the phosphor significantly low as compared with the conventional phosphor.

Thus, it will be noted that the present invention accomplishes an increase in luminance because the content of the conductive material which hinders the emission of the phosphor material is substantially low.

While the invention has been described with a certain degree of particularity, obvious modifications and variations are possible in the light of the above teachings. It is therefore to be understood that within the scope of the appended claims, the invention may be practiced otherwise than as specifically described.

What is claimed as new and desired to be secured by Letters Patent of the United States is:

1. Low-velocity electron excited phosphor comprising:

a phosphor material selected from the group consisting of $Y_2O_2S:Eu$; $Y_2O_3:Eu$; $YVO_4:Eu$; $(Zn_{1-x}Cd_x)S:Ag$ $0.65 < X \leq 0.9$; $Zn_3(PO_4)_2:Mn$; $Cd_2B_2O_{5:Mn}$; $Zn(S_{1-x}Se_x):Cu$ $0.05 \leq x \leq 0.6$; $Zn(S_{1-x}Se_x):Cu,Al$ $0.05 \leq x \leq 0.6$; $(Zn_{1-x}Cd_x)S:Ag, Al$ $0.5 < x \leq 0.7$; $(Zn_{1-x}Cd_x)S:Au,Al$ $0 \leq x \leq 0.2$; $(Zn_{1-x}Cd_x):Cu$ $0.1 < X \leq 0.2$; $(Zn_{1-x}Cd_x)S:Cu,Al$ $0.1 < x \leq 0.2$; $CaSiO_3:Pb,Mn$; $(Zn_{1-x}Cd_x)S:Cu,Al$ $0 \leq x \leq 0.1$; $SrGa_2S_4:Eu^{2+}$; $Y_3(Al_{1-x}Ga_x)_5O_{12}:Ce$ $0 \leq x \leq 0.5$; $Zn_2SiO_4:Mn$; $Y_2O_2S:Tb$; $La_2O_2S:Tb$; $(Zn_{1-x}Cd_x)S:Ag$ $0.3 \leq x \leq 0.5$; $ZnS:Au,Al$; $ZnS:Cu,Al$; $ZnS:Cu,AU,Al$; $Zn_2SiO_4:Mn,As$; $(Zn_{1-x}Cd_x)S:Cu$ $0 \leq x \leq 0.1$; $(Zn_{1-x}Cd_x)S:Ag,Al$ $0.3 \leq x \leq 0.5$; $ZnS:Ag$; $ZnS:Ag,Al$; $Zn(S,Se):Ag$; $Zn(S,Se):Ag,Al$; $Y_2SiO_5:Ce$; $SrGa_2S_4:Ce$; $Ca_2MgSiO_5:Ce$; $(Ca,Mg)_2SiO_4:Ti$; $(Ba,Mg)O_2.6Al_2O_3:Eu^{2+}$; $(Sr,Ba)_3(PO_4)_2:Eu^{2+}$ and $Ca_2B_5O_9Cl:Eu^{2+}$, said phosphor material being in the form of particles;

a conductive material selected from the group consisting of $In_2O_3$; $SnO_2$; $ZnO$; $TiO_2$; $WO_3$; $Nb_2O_3$; $CdS$; and $Cu_2S$, said conductive material being the form of fine particles having a particle distribution of which median is $0.1$-$2.4\mu$ and a standard deviation of $0.7\mu$ or less; and an organic binder said conductive material of fine particles being deposited on the surface of said particles of said phosphor material by means of said organic binder which is either water-soluble or organic solvent-soluble.

2. Low-velocity electron excited phosphor as defined in claim 1, wherein said organic binder is insoluble in a developer used for photolithography using photosensitive resin.

3. Low-velocity electron excited phosphor as defined in claim 2, wherein said organic binder is an organic solvent-insoluble and water-soluble polymer.

4. Low-velocity electron excited phosphor as defined in claim 3 wherein said organic binder is polyvinyl alcohol or methyl cellulose.

5. Low-velocity electron excited phosphor as defined in claim 2, wherein said organic binder is a water- or aqueous solution-insoluble and organic solvent-soluble polymer.

6. Low-velocity electron excited phosphor as defined in claim 5 wherein said organic binder is ethyl cellulose or nitrocellulose.

* * * * *